(12) United States Patent
Wesch-Potente et al.

(10) Patent No.: US 12,206,791 B2
(45) Date of Patent: Jan. 21, 2025

(54) METHOD AND SYSTEM FOR SECURELY PROVIDING DATA OF AN OBJECT OVER THE ENTIRE LIFE OF THE OBJECT

(71) Applicant: Phoenix Contact GmbH & Co. KG, Blomberg (DE)

(72) Inventors: Cathrin Wesch-Potente, Detmold (DE); Sven Heissmeyer, Aerzen (DE); Johannes Kalhoff, Lemgo (DE); Soeren Volgmann, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 477 days.

(21) Appl. No.: 17/602,696

(22) PCT Filed: Apr. 3, 2020

(86) PCT No.: PCT/EP2020/059538
§ 371 (c)(1),
(2) Date: Oct. 8, 2021

(87) PCT Pub. No.: WO2020/207913
PCT Pub. Date: Oct. 15, 2020

(65) Prior Publication Data
US 2022/0209961 A1    Jun. 30, 2022

(30) Foreign Application Priority Data
Apr. 9, 2019 (BE) .................... 2019/5230

(51) Int. Cl.
*H04L 9/32* (2006.01)
*G06F 16/182* (2019.01)
(Continued)

(52) U.S. Cl.
CPC ........ *H04L 9/3247* (2013.01); *G06F 16/1824* (2019.01); *H04L 9/0825* (2013.01); *H04L 9/3236* (2013.01); *H04L 9/50* (2022.05)

(58) Field of Classification Search
CPC .................................................. G06F 16/1824
See application file for complete search history.

(56) References Cited

U.S. PATENT DOCUMENTS 8,108,430 B2  1/2012 Wong et al.
8,195,646 B2  6/2012 Evans et al.
(Continued)

FOREIGN PATENT DOCUMENTS

CN    104106276 A    10/2014
CN    105324750 A    2/2016
(Continued)

OTHER PUBLICATIONS

Authorized Officer: Hultsch, Wolfgang, English translation of the International Preliminary Report on Patentability issued in counterpart PCT application No. PCT/EP2020/059538, Jan. 28, 2021, 9 pp.

(Continued)

*Primary Examiner* — Jonathan A Bui
(74) *Attorney, Agent, or Firm* — Kaplan Breyer Schwarz, LLP

(57) ABSTRACT

A method for securely providing data of an object over the entire life cycle thereof and to a system for carrying out this method, wherein the system is configured as a decentralized distributed content-addressed storage system.

21 Claims, 11 Drawing Sheets

(51) Int. Cl.
*H04L 9/00* (2022.01)
*H04L 9/08* (2006.01)

(56) References Cited

U.S. PATENT DOCUMENTS

| | | | |
|---|---|---|---|
| 9,684,505 | B2 | 6/2017 | Kaneki et al. |
| 10,887,301 | B1* | 1/2021 | Vera ............... H04L 9/3239 |
| 2006/0004873 | A1 | 1/2006 | Wong et al. |
| 2006/0242164 | A1 | 10/2006 | Evans et al. |
| 2008/0127135 | A1 | 5/2008 | Bergstrom et al. |
| 2016/0070565 | A1 | 3/2016 | Kaneki et al. |
| 2017/0033932 | A1 | 2/2017 | Truu et al. |
| 2017/0236094 | A1 | 8/2017 | Shah |
| 2017/0364355 | A1 | 12/2017 | Nitschke et al. |
| 2018/0088928 | A1 | 3/2018 | Smith et al. |
| 2018/0096175 | A1 | 4/2018 | Schmeling et al. |
| 2018/0173203 | A1 | 6/2018 | Freer et al. |
| 2018/0176229 | A1 | 6/2018 | Bathen et al. |
| 2018/0189732 | A1 | 7/2018 | Kozloski et al. |
| 2019/0013948 | A1* | 1/2019 | Mercuri ............ G06Q 20/3827 |
| 2019/0179806 | A1* | 6/2019 | Reinsberg ........... G06F 16/1834 |
| 2019/0208422 | A1* | 7/2019 | Haleem .............. H04W 12/102 |
| 2020/0074111 | A1* | 3/2020 | Mitchell ............. G06F 16/1824 |
| 2020/0218795 | A1* | 7/2020 | Antar ................. H04L 9/0643 |
| 2021/0201318 | A1* | 7/2021 | Wylie ................ H04L 63/08 |

FOREIGN PATENT DOCUMENTS

| | | |
|---|---|---|
| DE | 10051130 A1 | 4/2002 |
| DE | 102004059391 A1 | 6/2006 |
| DE | 112013007160 T5 | 3/2016 |
| DE | 102016206916 A1 | 10/2017 |
| DE | 102016215914 A1 | 3/2018 |
| DE | 102016215915 A1 | 3/2018 |
| DE | 102016215917 A1 | 3/2018 |
| DE | 102016118610 A1 | 4/2018 |
| DE | 102016118611 A1 | 4/2018 |
| DE | 102016118612 A1 | 4/2018 |
| DE | 102016118613 A1 | 4/2018 |
| DE | 102016118614 A1 | 4/2018 |
| DE | 102016118615 A1 | 4/2018 |
| JP | H05113877 A | 5/1993 |
| JP | 2000-076049 A | 3/2000 |
| WO | 2018/028766 A1 | 2/2018 |
| WO | 2018/091091 A1 | 5/2018 |
| WO | 2018/164695 A1 | 9/2018 |
| WO | 2018/200215 A1 | 11/2018 |
| WO | 2018/223042 A1 | 12/2018 |

OTHER PUBLICATIONS

"Cipher Block Chaining Mode", Wikipedia, May 5, 2019, 5 pp.
Authorized Officer: Hultsch, Wolfgang, International Search Report issued in counterpart PCT application No. PCT/EP2020/059538, Jun. 24, 2020, 2 pp.
Editor: Wolfgang Dorst, "Implementation Strategy Industrie 4.0", Apr. 1, 2015, Publisher: Bitkom e.V., ISBN 978-3-00-052211-6, 104 pp.
Search Report issued in counterpart Belgian patent application No. BE2019/5230, Oct. 9, 2019, 13 pp.

* cited by examiner

METHOD AND SYSTEM FOR SECURELY PROVIDING DATA OF AN OBJECT OVER THE ENTIRE LIFE OF THE OBJECT

FIELD

The present invention relates to a method for securely providing data of an object over the entire life cycle thereof and to a system which is designed to carry out this method.

BACKGROUND

The product life cycle of electrotechnical products and assemblies thereof extends over a large number of organizational entities, in a interlinked manner. Guideline VDI/VDE 2182 describes dependencies between manufacturers of automation solutions, mechanical engineers, and system integrators as well as the operators of manufacturing and processing plants. The guideline follows a risk-based approach which initially describes the automation solution as the object under consideration. The object under consideration goes through various life cycle phases (manufacture, integration, operation). It has to be considered here that a life cycle phase is not necessarily restricted to a single organization.

Product Lifecycle Management (PLM) is a concept for the integrated consolidation of all data arising in the life cycle of a product. The core functions of a PLM system are product structuring and document management. The functions more or less strictly follow a superimposed procedure model for configuration management (e.g. CMII, ANS1649, ISO10007). Configuration management includes methods for managing configuration items:

Identification and naming of configuration items,
Identification of configuration changes,
Acceptance of configuration changes,
Audit of configurations.

Thus, PLM is actually a cross-organizational process and requires models for identities, revision statuses, acceptance events, and auditability.

However, conventionally, PLM is operated from the perspective of an individual organization and is implemented in the IT systems of this organization. Leading conventional PLM solutions are, for example, Siemens Teamcenter or the ARAS PLM platform. The offer is aimed at companies that desire to improve their PLM processes. The technical features of the system range from on-site installations to cloud installations. In the case of on-site installations, the entire PLM system is executed at the applying company on the company's own infrastructure, in the case of cloud installations in a centrally hosted infrastructure on the Internet. In conventional PLM solutions, the aforementioned methods for managing configuration items are implemented as follows, for example:

Identification and naming of configuration items: Configuration items are identified by a user-defined or automatically incremented character string (e.g. part number). Users are identified by user names and authenticated by passwords. This information is managed in identity management systems (e.g. Microsoft Active Directory) within a company.

Identification of configuration changes: modifications to the configuration items are identified by consecutive numbering (change index).

Acceptance of configuration changes: access to the configuration items is authorized within the company on the basis of role-based access.

Therefore, system support for cross-organizational PLM processes fails due to different implementations of aspects such as authentication and authorization, the identification of revision statuses, and the data revision processes, depending on the organization. Obviously, an audit of configurations cannot be performed across organizations either.

A modern PLM therefore requires models for identities, revision statuses, acceptance events, and auditability, which can also be implemented across organizations or companies.

A look at current trends which are often referred to with buzzwords such as "Industry 4.0" or "Internet of Things" (IoT), makes the need for a PLM that works across organizations appear all the more urgent.

With the "Reference Architecture Model Industry 4.0" (RAMI 4.0) and the "Industry 4.0 Component" developed by Platform Industry 4.0, two tools were created for making existing standards and technologies manageable. The novelty about the Industry 4.0 component is the extension of a respective physical item with the administration shell. The administration shell is a virtual image of the physical item and describes its functionalities. The Industry 4.0 component can thus describe itself and carries entire data collections with it over its life cycle. Industry 4.0-compliant communication also takes place via the administration shell of the Industry 4.0 component. Products and equipment that are designed as Industry 4.0 components are able to communicate with one another both in the factory and across companies.

SUMMARY

The object of the invention is to provide a method and a system for securely providing data of an item, or object, over the entire life cycle thereof, which enables PLM to function across organizations.

In the context of the invention, products or configuration items are also referred to as objects. Below, the invention is described using the example of products and equipment from the field of automation technology. In principle, however, the invention enables PLM to function across organizations for any arbitrary objects.

Important objects in the field of automation technology are, for example, field devices that are employed in industrial plants, in process automation technology, and in production automation technology. In principle, any devices that are used close to the process and that supply or process process-relevant information are referred to as field devices. For example, field devices are used to capture and/or to control process variables. Measurement devices or sensors are used to capture process variables. Actuators are used to control process variables. In modern industrial plants, field devices are usually connected to higher-level entities via communication networks such as field buses (Profibus®, Foundation® Fieldbus, HART®, etc.). Normally, the higher-level entities are control units, such as a PLC (programmable logic controller). The higher-level entities are used, inter alia, for process control as well as for commissioning, configuration, and parameterization of field devices.

In the industrial environment, a large number of devices are configured, which are provided within an automation network. The configuration data must be checked for their integrity or validity or origin. For example, it has to be ensured that the configuration data include non-tampered parameters or an intact program or a suitable configuration in order to meet safety or security requirements, for example.

Patent application publication DE 10 2016 118 614 A1 describes methods for tamper-proof storage of data from a field device using blockchain technology.

Patent application publication DE 10 2016 215 915 A1 describes a method for securely configuring a device using blockchain technology.

However, the cited prior art does not provide any solution for a PLM that functions across organizations.

For achieving the aforementioned object of the invention, the following aspects can preferably also be taken into account:

Authentication
Authorization
Collaboration of multiple agents
Processes for changing data
Identification of change statuses, also referred to as revision statuses
Acceptance of revision statuses
Confidentiality:
Data must only be read or modified by authorized users, this applies to both access to stored data and during data transfer.
Integrity:
Data must not be changed unnoticed. All changes must be traceable.
Availability:
Prevention of system failures; access to data must be guaranteed within an agreed timeframe.
Authenticity:
Describes the properties of authenticity, verifiability and trustworthiness of an object.
Liability/Non-repudiation:
Inadmissible denial of performed actions is not possible.
Accountability:
A performed action can be unambiguously associated with a communication partner.
Auditability:
Compliance with the aforementioned aspects can be demonstrated to a third party.

To achieve the object, the invention in particular proposes a method with the features of patent claim 1 and a system with the features of independent claim 21. Further advantageous embodiments of the method and system of the invention are specified in the dependent claims. The features and advantages specified for the method of the invention similarly also apply to the system of the invention.

Accordingly, a method is proposed for securely providing data of an object over the entire life cycle thereof, wherein each object is represented by a respective individual entity which is made identifiable on the basis of a cryptographic identity by generating an asymmetric key pair for each entity, comprising a public key and a private key, and to which an address is assigned, in particular a unique address. The method comprises the additional steps of:

(a) generating data relating to the object;
(b) generating a second hash value on the basis of the data generated in step (a) using a cryptographic hash function;
(c) generating a revision status;
(d) storing the data generated in step (a) and the second hash value as payload data, in particular payload data of the revision status, in the revision status of step (c);
(e) generating a third hash value on the basis of the revision status using a cryptographic hash function, wherein the third hash value serves as the address of the revision status;
(f) generating a data object;
(g) storing the revision status and the third hash value in the data object of step (f); and
(h) storing the data object in a decentralized distributed content-addressed storage system.

The method of the invention entails many advantages. For example, it provides for unambiguous and reliable identification and naming of configuration items that can be referred to as objects. Furthermore, it provides for unambiguous and reliable identification and naming of configuration changes (revision statuses), namely on the basis of hash values. Hash values also ensure the integrity of an object's data. Furthermore, in contrast to centrally hosted PLM systems, a decentralized distributed content-addressed storage system can be more flexible, more easily scalable, more performant, freely available, and more fail-safe. In this way, the method provides for a PLM that can be operated across organizations and therefore actually over the entire product life cycle.

The data of an object over the life cycle thereof may include all data relating to the object that are being or were generated before, during and/or after the manufacture thereof and which are desired to be further available. The object might be a product or equipment, a system, a machine, a component, a software, or, more generally, an object. The generating of these data according to step (a) can mean the generation of new and/or of modified data.

The individual or specific entity representing a respective object is a virtual image of the object, which describes the object using the data. With respect to RAMI 4.0, the entity thus essentially corresponds to the administration shell of an Industry 4.0 component. In data modeling, entity refers to a clearly identifiable object about which information is to be stored or processed. The object can be material or immaterial, concrete or abstract.

There are various possibilities for linking an object with the entity representing it. For example, the private and/or public key of the asymmetric key pair of the entity and/or the address of the entity can be stored in a memory module of the object, and in this case the memory module is in particular a secure hardware module, such as a Trusted Platform Module (TPM). Or, for example, the address of the entity may be provided on the surface of the object in an optically identifiable form, in particular as a two-dimensional code, especially a QR code, or as a Uniform Resource Identifier (URI), or the like. In this case, for example, a first hash value that has the function of an address would not need to be stored at all, since it can always be derived from the public key.

According to one embodiment of the method it is contemplated, for example, that the entity's public key or a first hash value that is generated using a cryptographic hash function on the basis of the entity's public key is used as the address of the entity. The method thus offers unambiguous and reliable identification and naming of configuration items, i.e. objects, namely on the basis of public cryptographic keys or hash values. The first hash value has the advantage over the public key that it is significantly shorter. In principle, however, the public key can also be used as an address.

According to a further embodiment of the method it is contemplated, for example, that the data relating to the object specify features of the object. For example, such data may describe properties and functions of the object. For example, this may comprise device configuration information, including, for example, configuration parameters, operating mode information, license or authorization information, security zone information, information on patches or software updates, regulations for permissible configuration settings. For example, threshold values or control parameters are specified as the configuration parameters. Furthermore, availability or release information on a software code, a patch, or a firmware is advantageously included, such as, for example, execution authorizations on particular devices or device types, or license information. Other examples of data relating to the object are manuals, circuit diagrams, and CAD drawings. Thus, advantageously, the data of the object can essentially be any arbitrary data.

According to a further embodiment of the method it is contemplated that the data relating to the object and stored in a revision status are structured hierarchically in files and folders, and that starting at the lowest hierarchical level up to the highest hierarchical level, at least one file hash value and/or folder hash value is generated step-by-step, depending on the number of existing files and/or folders. For each file, a file hash value is generated on the basis of the file content thereof using a cryptographic hash function. Furthermore, for each folder containing only a number of files, a folder hash value is generated on the basis of the file names and the file hash values of the files contained in the folder using a cryptographic hash function. Furthermore, for each folder containing only a number of folders, a folder hash value is generated on the basis of the folder names and the folder hash values of the folders contained in the folder using a cryptographic hash function. Furthermore, for each folder containing a number of folders and a number of files, a folder hash value is generated on the basis of the folder names and the folder hash values of the folders contained in the folder and based on the file names and the file hash values of the files contained in the folder using a cryptographic hash function. Finally, the second hash value is generated in step (b) on the basis of the folder names and folder hash values of the folders present on the highest hierarchy level and/or on the basis of the file names and file hash values of the files present on the highest hierarchy level using a cryptographic hash function.

Thus, advantageously, the data of an object may have structures of any desired complexity without this impacting the security of the data that can be achieved, in particular with regard to the integrity thereof. The structuring of the data relating to an object in files and folders that belong to revision statuses which reference other revision statuses may, for example, be implemented according to the data model of the GIT version control system.

According to a further embodiment of the method it is contemplated, for example, that in step (d), in addition to the user data, additional data are stored in the revision status generated in step (c), including an author of the revision, a revision date, a revision time, a text describing the revision, and/or a data volume value. These additional data may in particular be stored as metadata of the revision status. Advantageously, these additional data or metadata relating to a revision status, in particular relating to each revision status, will thus be immediately available and will therefore, for example, allow quick assessment of the data contained, for example with regard to currentness or relevance.

According to a further embodiment of the method it is contemplated, for example for the association of entity and revision status, that in step (d), in addition to the payload data, the address of at least one entity is stored as additional data in the revision status generated in step (c). Another option for associating entity and revision status will be described further below.

According to a further embodiment of the method it is contemplated that in step (g) a name is generated for the revision status and is assigned to the revision status and is also stored in the data object generated in step (f). This name might be a sensible designation of the revision status, such as "installation status", "planned status" or "version 1.0", which is easier to understand and remember for the user than a hash value. This facilitates the targeted reviewing or comparing of multiple revision statuses, for example when proposing and accepting revisions, especially since the "most current" revision status is not always important or required.

According to a further embodiment of the method it is contemplated that in step (d), in addition to the payload data, the third hash value of an older revision status or the third hash values of multiple older revision statuses is or are stored as additional data in the revision status generated in step (c). Hence, additional data may also be reference data or address data serving as references or pointers. In this simple way, a link to an older revision status can be established. In this case, the data of the new revision status supplement or overwrite the data of the older revision status. This entails further advantages. On the one hand, storage space can be saved, since the new revision status does not need to contain the unchanged data of the linked older revision status per se, but only need to refer thereto. On the other hand, a history of revision statuses can easily be produced or traced in this way.

According to a further embodiment of the method it is contemplated that the life cycle of the object does not just begin with its production, but rather beforehand, and that the object is existent as an object type prior to its manufacture, and later, with the start of its production, it is existent as at least one object instance. It is furthermore contemplated that each object instance is derived from the object type, and that each object type and each object instance is represented by a respective individual entity. Furthermore, in step (d), in addition to the payload data, the third hash value of a revision status of the object type is stored as additional data in the revision status generated in step (c) of a newly derived object instance. The number of object instances will correspond to the number of items produced. Examples of object types and object instances are given in the description of an exemplary embodiment. By being derived from an object type, the object instance can take over or inherit the data relating to the object type. This is achieved by linking to a revision status of the object type based on the hash value thereof in the revision status of the object instance. In this simple and advantageous way, a uniform data basis can be provided with a revision status of an object type, and the data contained in this revision status of the object type can be transferred or taken over in full or in part for each object instance derived from this object type. Here, a partial transfer of data from the object type to the object instance is possible, for example, by copying the selected data from the revision status of the object type into the revision status of the object instance. Moreover, it is possible for an object type, for example, to have multiple parallel revision statuses, each one including different but current data subsets, and each revision status has a different name assigned thereto. For example, each of these parallel revision statuses may correspond to a production variant with specific features. An object instance derived from such an object type that has multiple parallel revision statuses will favorably only take over or inherit the data of one of the parallel revision statuses of the object type, that means a revision status of this object instance will store the third hash value of one of the parallel revision statuses of the object type as additional data, in addition to the payload data. Thus, this is also a further example of a partial transfer of data from the object type to the object instance.

According to a further embodiment of the method it is contemplated that in step (d), in addition to the payload data, the third hash value of a new revision status of the object type is stored as additional data in the revision status of an existing object instance generated in step (c). In this simple and advantageous way, a revision or update such as a firmware update can be provided as a new revision status of an object type, and for each object instance derived from this object type, the data contained in this new revision status of the object type can or should be taken over. This is achieved by linking with the new revision status of the object type on the basis of its hash value in a new revision status of the object instance.

According to a further embodiment of the method it is contemplated that in step (d), in addition to the payload data, the third hash value of a revision status of another object type or the third hash values of revision statuses of multiple other object types is or are stored as additional data in the revision status of an object type generated in step (c). This simple and advantageous way makes it even possible to provide the data of complex composite or modularly structured objects. For example, in this case, an object instance derived from such a composite object type can take over or inherit the data of all linked object types. However, it would also be possible for an object instance derived from such a composite object type to only take over or inherit the data from less than all linked object types. Thus, this is another example of a partial take-over of data from the object type to the object instance.

For the case where a composite object instance is to be generated spontaneously and in particular uniquely, for example when building a single machine, without a corresponding composite object type existing, the third hash value of a revision status of another object instance or the third hash values of revision statuses of a plurality of other object instances can be stored as additional data in a revision status of this object instance in addition to the payload data.

According to a further embodiment of the method it is contemplated that the decentralized distributed content-addressed storage system is configured in accordance with the InterPlanetary File System (IPFS).

According to a further embodiment of the method it is contemplated that a person involved in the method is also represented by a separate entity. An entity representing a person can also be made identifiable on the basis of a cryptographic identity by generating an asymmetrical key pair for this person, comprising a public key and a private key. Furthermore, an address, in particular a unique address can also be assigned to the entity representing a person. The public key of the entity or a first hash value that is generated on the basis of the entity's public key using a cryptographic hash function may serve as the address of the entity. Thus, the corresponding embodiment of the method also offers an unambiguous and reliable identification and naming of persons which are in particular users, namely on the basis of public cryptographic keys or hash values. Furthermore, the data relating to a person can then be provided essentially in the same way as the data relating to an object.

There are various options for storing the private and/or public key of the asymmetric key pair and/or the address of the entity representing a person, while the first hash value can always be derived from the public key and therefore does not have to be stored. For example, the storing may be accomplished in a memory module that is in the possession of the person, for example a Trusted Platform Module (TPM) or a USB token. Read and write access to the memory module may additionally be secured by a PIN or a password. Alternatively, the storing may be accomplished in an authentication system, in particular a company-internal authentication system such as Active Directory or Kerberos, in which case read and write access to the authentication system is expediently secured by a user name and a password. Alternatively, the storing may also be accomplished by printing out the keys, for example on a sheet of paper in the form of text, in particular in hexadecimal representation, or in the form of a two-dimensional code, in particular QR code, or in the form of a Uniform Resource Identifier (URI) or the like, that is in the possession of the person.

According to a further embodiment of the method it is contemplated that in step (g), following the storing of the revision status and, if existent, of the name assigned to the revision status and/or the third hash value, the data object is encrypted using a randomly generated symmetrical session key, so that the data object with the revision status contained therein and the third hash value assigned thereto and the name, if applicable, is then existent in the form of an in particular completely encrypted data object.

In this regard it is contemplated according to a further embodiment of the method that in step (g), after the revision status has been encrypted, the symmetric session key is encrypted using the asymmetric public key of an intended recipient, in particular of an entity intended as the recipient.

This has the advantage that, now, confidentiality is also guaranteed for the revisions made with regard to the data of an object or an object type or an object instance.

According to a further embodiment of the method it is contemplated that, finally, in step (g), a fourth hash value is generated on the basis of the data object using a cryptographic hash function, and that the fourth hash value serves as the address of the data object. This can be done for unencrypted as well as for encrypted data objects.

Thanks to the fourth hash value, the respective data object can be uniquely addressed and retrieved in the decentralized distributed content-addressed storage system. For decrypting an encrypted data object, however, the appropriate symmetric session key will then be required. An intended recipient may have received the appropriate symmetric session key that had been encrypted with the asymmetric public key of the intended recipient, for example by e-mail. The recipient can decrypt the encrypted session key using his asymmetric private key and can then decrypt the encrypted data object using the session key.

According to a further embodiment of the method it is contemplated that for the revision status stored in step (g), a permanent message, in particular in the form of a transaction, is generated and stored in a decentralized distributed storage system based on blockchain technology (referred to as blockchain storage system below, for short). In particular, the blockchain storage system stores at least one data block which comprises a data content and a hash value, wherein the hash value was generated on the basis of the data content of the data block using a cryptographic hash function and serves as the address of the data block. The method according to this embodiment comprises the further steps of:

(i) generating a transaction;
(j) storing the fourth hash value as part of transaction data in the transaction of step (i) and thereby linking the transaction to the data object of step (h), in which the revision status is stored;
(k) generating a data block;

(l) storing the transaction as data content in the data block of step (k);

(m) determining a fifth hash value which is the hash value of the data block last stored in the blockchain storage system;

(n) storing the fifth hash value as data content in the data block of step (k);

(o) generating a hash value for the data block on the basis of the data content of the data block using a cryptographic hash function, wherein the hash value serves as the address of the data block;

(p) storing the hash value generated in step (o) in the data block; and (q) storing the data block in the blockchain storage system which also stores the data blocks generated at earlier points in time.

The data content thus includes the transaction stored in the data block, in particular all transactions stored in the data block, as well as the hash value of the data block last or most recently stored in the blockchain storage system. By storing the hash value of the data block most recently stored in the blockchain storage system in the data content of the newly generated data block, linkage or chain-linking of the data blocks is achieved, each data block always being linked or chained to the previously stored data block, so that, gradually, a chain of data blocks is created that is constantly growing.

Thus, the changes or revisions made to the data of an object or of an object type or of an object instance are documented unchangeably and permanently, in a simple and advantageous manner. In particular if a time stamp is additionally stored in the data block, the point in time when the revisions were made will advantageously also be documented in an unchangeable, permanent and indisputable manner.

Like the first storage system for storing the revision statuses, the second storage system which is based on blockchain technology and serves to store the messages about stored revision statuses in the form of transactions is also configured as a decentralized distributed storage system and thus also offers the advantages already mentioned above, namely flexibility, scalability (i.e. the system capacity can be easily adapted to the volume of data, transactions, and users), availability, and reliability, and is therefore also suitable for cross-organizational PLM. The first and second storage systems represent two essentially independent storage systems. The additional storing of a permanent message about the storing of a revision status also has the advantage that even if at any time a revision status should not be available anymore in the first storage system for revision statuses, it will still be verifiable that once there was this revision status, by virtue of the message stored in the second storage system. The storage system based on blockchain technology can in particular be provided by a blockchain service platform such as Ethereum.

According to a further embodiment of the method it is contemplated that in step (j) the encrypted session key is stored as a further part of the transaction data in the transaction of step (i). As a result, although the encrypted session key can be retrieved from the blockchain storage system by any interested recipient, only an intended recipient will be able to decrypt the encrypted session key using his asymmetric private key and then to decrypt the encrypted revision status using the session key, whereby the data object that stores the encrypted revision status is unambiguously addressable in and retrievable from the decentralized distributed content-addressed storage system on the basis of the fourth hash value stored together with the encrypted session key in the transaction.

Preferably it is furthermore contemplated according to the method that in step (j) a signature is additionally stored as part of the transaction data in the transaction generated in step (i), the signature being a value identifying the originator of the transaction, in particular a numerical value which is generated on the basis of the fourth hash value and an asymmetric private key of the originator, in particular of an entity considered to be the originator, using an asymmetric cryptographic function.

This signing has many further advantages. By storing the signatures in transactions, these signatures can be verified locally. A method adapted in this way also offers accountability, liability, and non-repudiation for the revisions made with regard to the data of an object or an object type or an object instance, which are stored in a revision status, and thus also increases integrity and authenticity. This is also of great advantage in terms of auditability, i.e. verifiability vis-à-vis a third party, since the originator can be proven for each signed revision status.

A transaction that has a signature and refers to a specific revision status furthermore allows to reliably represent the acceptance of this revision status, for example. In this case, the recipient can decide whether to authorize the originator, who can be verified using the signature, to accept revisions.

If it is intended for a transaction to generally not be storable without a signature, it is also possible to reliably represent a locally verifiable write authorization, for example.

It may furthermore favorably be contemplated for the method to generate and store transactions of the blockchain storage system for other purposes as well. For example, a transaction may store the address (in particular the first hash value) of an entity and the address (the third hash value) of a revision status as the transaction data, in order to associate with each other an entity and a revision status. As an alternative or in addition to the address of the revision status, it is also possible to store, in the transaction as part of the transaction data, the address (the fourth hash value) of the data object containing the revision status. Also, the name optionally assigned to the revision status could be stored in the transaction as part of the transaction data. This means, any number of revision statuses can be associated with an entity and any number of entities can be associated with a revision status. In order to not have to generate and store a separate transaction for each entity-revision status association, it is possible to store, in a transaction, a plurality of addresses of entities together with one address of a revision status, or a plurality of addresses of revision statuses together with one address of an entity.

According to a further embodiment of the method it is contemplated that method steps (a) through (g) or (a) through (q) are carried out by an object entity. This will be discussed in greater detail further below in conjunction with the system of the invention.

Furthermore, according to a further embodiment of the method it is contemplated that, if required or depending on the event, the method steps (a) through (g) or (a) through (q) are carried out repeatedly. Advantageously, for example, the respective method steps can be performed each time when there are new features or modifications with regard to the data of an object or of an object type or of an object instance, i.e. several times per object type or object instance.

Furthermore, a system is also proposed which is configured for performing the method of the invention, in particular including at least one of the optional embodiments thereof, for securely providing data of an object over the entire life cycle thereof. The system comprises a communication network including at least two subscriber nodes, each of which comprises a storage device and a processing device as well as a communication device for being coupled to and communicating via the communication network. The data of an object can be stored in the storage device and can be provided to at least one further subscriber node in the communication network via the communication device. Furthermore, the storage device stores a machine-executable program code which, when executed by the processing device, causes the data of an object to be provided according to the method as described above. Furthermore, the system itself is configured as a decentralized distributed content-addressed storage system, or it forms part of a higher-level system that is configured as a decentralized distributed content-addressed storage system, or it is in communication with a decentralized distributed content-addressed storage system, for example via one of the subscriber nodes. Additionally, the system itself may be configured as a decentralized distributed storage system based on blockchain technology (blockchain storage system) or may form part of a higher-level system that is configured as a blockchain storage system or may be in communication with a blockchain storage system, for example via one of the subscriber nodes.

The features and advantages described above for the method and its optional embodiments similarly also apply to the proposed system.

If an object or an object instance is a device or a machine, for example, and if this object instance has a storage device, a processing or computing device, and a communication device, it may be configured to independently or automatically execute the method steps according to the invention. That is to say, according to the invention, such an object instance will be able to reliably provide data, in particular data relating to itself. In this case, the object instance itself may be configured as a subscriber node in the communication network of the system according to the invention, or may be in communication with a subscriber node, in particular for reasons of insufficient computing and/or storage capacity. What is important in this case is that the entity representing the object instance, in particular the private key of the asymmetrical key pair of the entity, remains with the object instance, so that the object instance is able to sign the provided data such as a changed status or a changed network address.

BRIEF DESCRIPTION OF THE DRAWINGS

These and further features as well as the various advantages of the present invention will further become apparent from the exemplary embodiments that will be explained in more detail below with reference to the accompanying drawings wherein.

DETAILED DESCRIPTION

Figure 1A:
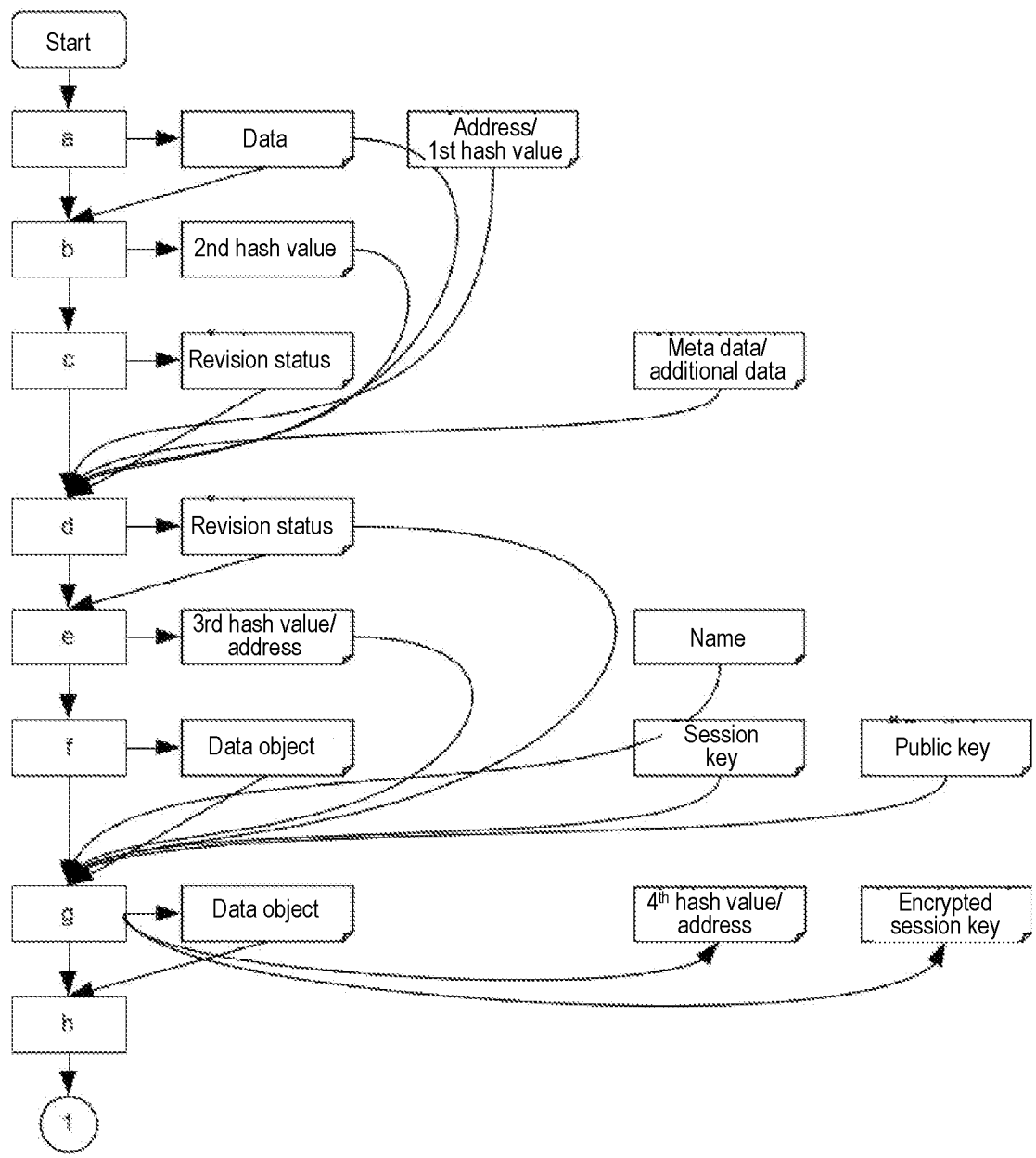
FIG. 1a schematically illustrates an exemplary embodiment of the method from step (a) to step (h) in the form of a simple flow chart.
Figure 1B:
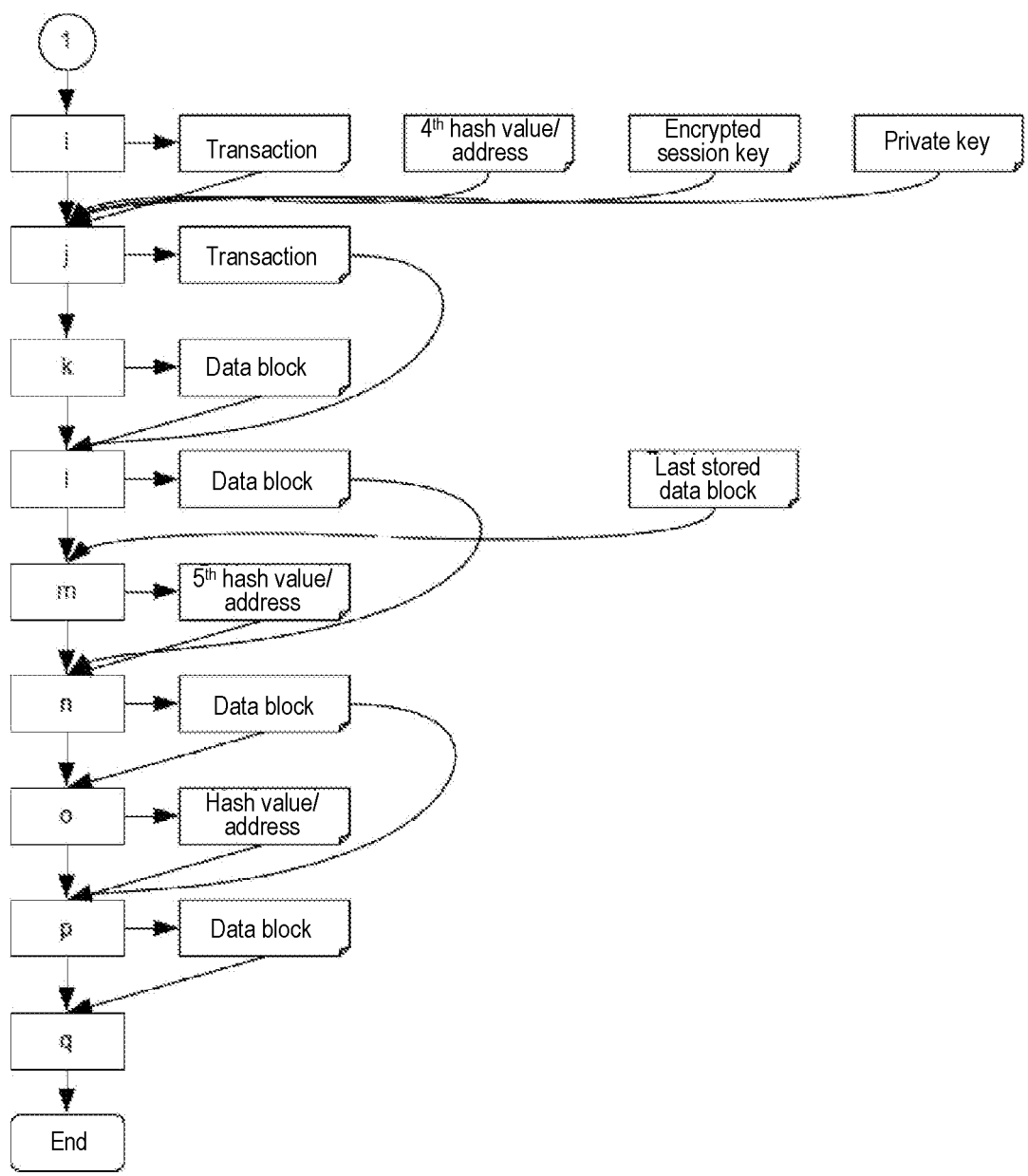
FIG. 1b schematically illustrates an exemplary embodiment of the method from step (i) to step (q) in the form of a simple flow chart.

FIGS. 1a and 1b illustrate the method steps a) to q) of an exemplary embodiment of the method for securely providing data of an object over the entire life cycle thereof, which are carried out sequentially. The connector symbol labelled "1" in a circle provides the connection between method step (h) in FIG. 1a and method step (i) in FIG. 1b.

It is assumed, here, that the life cycle of the object does not just begin with its production, but already beforehand, and that before its production the object is existent as an object type and then, with the start of its production, as at least one object instance, and that each object instance is derived from the object type, and that each object type and each object instance is represented by a respective individual entity. In this case, the number of object instances will then correspond to the number of items produced. By being derived from an object type, the object instance can take over or inherit at least part of the data relating to the object type.

The method will now be discussed in more detail for a newly generated object instance.

However, before method step (a) can be started, an entity representing the object instance must first be generated, which is made identifiable on the basis of a cryptographic identity by generating an asymmetric key pair, comprising a public key and a private key, and which is made addressable on the basis of a first hash value, for example, which is generated using a cryptographic hash function that is based on the public key of the entity. The method then comprises the following additional steps:

In step (a), data are generated which relate to the object instance and which are to be provided. This may be any data which specify features of the object instance, for example, or which describe properties and/or functions of the object instance. In any case, this data will then be structured hierarchically in files and folders.

In step (b), a second hash value is generated on the basis of the data from step (a) using a cryptographic hash function. For this purpose, depending on the number of files and/or folders existent, at least one file hash value and/or folder hash value is generated successively, starting at the lowest hierarchical level up to the highest hierarchical level. For each file, a file hash value is generated on the basis of the file content thereof, using a cryptographic hash function. Furthermore, for each folder that only contains a number of files, a folder hash value is generated on the basis of the file names and the file hash values of the files contained in the folder, using a cryptographic hash function. Furthermore, for each folder that only contains a number of folders, a folder hash value is generated on the basis of the folder names and the folder hash values of the folders contained in the folder, using a cryptographic hash function. Furthermore, for each folder that contains a number of folders and a number of files, a folder hash value is generated on the basis of the folder names and the folder hash values of the folders contained in the folder and on the basis of the file names and the file hash values of the files contained in the folder, using a cryptographic hash function. Until, finally, the second hash value is generated on the basis of the folder names and the folder hash values of the folders present on the highest hierarchy level and/or based on the file names and file hash values of the files present on the highest hierarchy level.

In step (c), a new revision status is generated.

In step (d), the data generated in step (a) and the second hash value generated in step (b) are stored as payload data in the revision status generated in step (c). In addition, in this example, the address of the entity is also stored as additional data in the revision status of step (c), in order to link the new revision status with the entity. Thus, the revision status and its content are associated with the entity. Furthermore, in addition to the payload data, the third hash value of a revision status of the object type is stored in the revision status of step (c) (not shown in FIG. 1a) and, thus, a link to this revision status is established. The data of the new revision status of the object instance then possibly supplement or overwrite the data of the linked older revision status of the object type. Furthermore, in addition to the user data, the revision status of step (c) stores an author of the revision, a revision date, a revision time, a text describing the revision, and/or a data volume value, in particular in the form of metadata of the revision status, the metadata also being additional data.

In step (e), a third hash value is generated on the basis of the revision status using a cryptographic hash function. Both the user data and the additional data stored in the revision status are taken into account for this. The third hash value then serves as the address of the revision status.

In step (f), a new data object is generated, which is intended for being stored in a decentralized distributed content-addressed storage system which may be configured according to the InterPlanetary File System (IPFS).

In step (g), a name is generated for the revision status and is assigned to the revision status. The name may, for example, be a designation or a version number which is easily comprehensible in particular for the user. The assignment may be achieved, for example, by linking the name with the third hash value that serves as the address of the revision status. Subsequently, the revision status, the third hash value, and the name are stored in the data object of step (f). Then, the data object containing the revision status, the third hash value, and the name assigned to the revision status is encrypted using a randomly generated symmetrical session key. Once the data object has been encrypted, the symmetric session key is encrypted with the asymmetric public key of an intended recipient. Furthermore, a fourth hash value is generated on the basis of the data object using a cryptographic hash function, the fourth hash value serving as the address of the data object.

Finally, in step (h), the data object is stored in the decentralized distributed content-addressed storage system.

In addition, a permanent message in the form of a transaction is intended to be generated for the revision status stored in step (g) and to be stored in a decentralized storage system based on blockchain technology (blockchain storage system). The blockchain storage system already stores at least one data block which includes data content and a hash value, which hash value was generated on the basis of the data content of the data block using a cryptographic hash function and serves as the address of the data block. Should there actually exist only a single data block stored in the blockchain storage system, it is known as genesis block which represents the first data block in the block chain and is the only data block that does not refer to a previous data block. However, further data blocks may already have been stored in the blockchain storage system. The following further steps are therefore contemplated:

In step (i), a new transaction is generated, which is intended to function as a permanent message about the storing of the revision status performed in step (g).

In step (j), the fourth hash value is stored as part of transaction data in the transaction of step (i) and, thus, the new transaction is linked to the data object from step (h) which stores the revision status. Furthermore, a current time stamp is generated and stored as part of the transaction data in the transaction (not shown in FIG. 1b). In addition, the encrypted session key from step (g) is stored as a further part of the transaction data in the transaction of step (i). Additionally, a signature (not shown in FIG. 1b) is stored as part of the transaction data in the transaction, the signature being a numerical value identifying the originator of the transaction, which is generated on the basis of the fourth hash value and an asymmetric private key of the originator using an asymmetric cryptographic function. In another example, not shown, additional parts of the transaction data may also be taken into account when generating the signature.

In step (k), a data block is then generated in accordance with blockchain technology.

In step (l), the transaction is stored in the data block.

In step (m), a fifth hash value is determined, this being the hash value of the data block most recently stored in the blockchain storage system.

In step (n), the fifth hash value is stored as additional data content in the data block of step (k).

In step (o), a hash value is generated for the data block based on the data content of the data block using a cryptographic hash function, the hash value serving as the address of the data block.

In step (p), the hash value generated in step (o) is stored in the data block.

In step (q), the data block is stored in the blockchain storage system which also stores the data blocks created at earlier points in time. This documents the storing of the revision status in the blockchain, i.e. in the blockchain storage system.

In a further exemplary implementation of the method, not illustrated in FIGS. 1a and 1b, which is performed with regard to an object instance, step d) may comprise to store, in the new revision status of an object type, as additional data in addition to the payload data, the third hash value of a revision status of a further object type or the third hash values of revision statuses of several further object types, thereby establishing links to these revision statuses. This would be the case if the object type is a type of object composed of a plurality of object types or is an object type having a modular structure.

In a further exemplary implementation of the method, not illustrated in FIGS. 1a and 1b, which is performed with regard to an object instance, step d) may comprise to store, in the new revision status of an already existing object instance, as additional data in addition to the payload data, the third hash value of an older revision status of the object instance, thereby establishing a link to the older revision status. In this case, the data of the new revision status will then optionally supplement or overwrite the data of the linked older revision status.

In a further exemplary implementation of the method, not illustrated in FIGS. 1a and 1b, which is performed with regard to an object instance, step d) may comprise to store, in the new revision status of an already existing object instance, as additional data in addition to the payload data, the third hash value of a new revision status of the object instance, thereby establishing a link to the new revision status of the object type. This would be the case when a revision or update such as a firmware update was provided as a new revision status of an object type, which is to be accepted for the object instance derived from the object type.

A recipient which, based on a permanent message in the blockchain storage system desires to read and optionally further process the data of the referenced revision status, will substantially simply carry out the process steps in reverse order. Thus, the recipient will first read the transaction data from the transaction serving as a permanent message within the blockchain storage system. He or she will thus obtain the fourth hash value, which addresses the data object containing the revision status, the time stamp of the storage of the transaction, the session key encrypted with his or her asymmetric public key, and the signature of the originator or publisher of the transaction. Using the asymmetric private key, the recipient will be able to decrypt the session key. Using the fourth hash value, the recipient retrieves the corresponding data object in the decentralized distributed content-addressed storage system and will find therein the revision status encrypted with the symmetrical session key together with the assigned name and the third hash value, which he or she can decrypt using the previously decrypted session key and then read.

Figure 2:
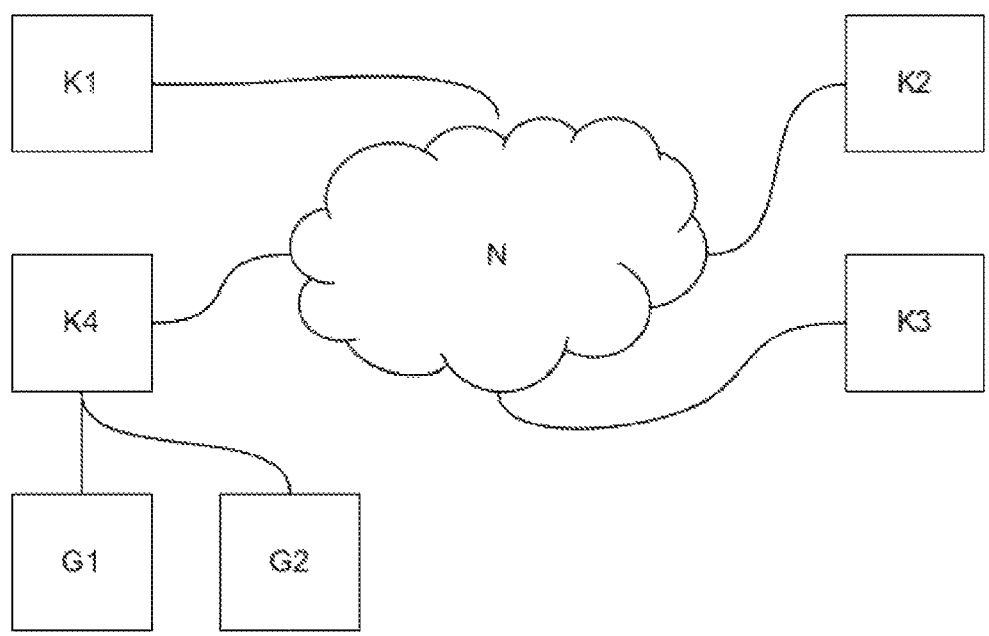
FIG. 2 schematically illustrates an exemplary embodiment of the system.

FIG. 2 shows an exemplary embodiment of the system for carrying out the method for securely providing data of an object over the entire life cycle thereof. It comprises a communication network N and four subscriber nodes K1, . . . , K4, each subscriber node including a storage device and a processing device as well as a communication device for being coupled to and communicating via the communication network, although not illustrated in FIG. 2.

On the one hand, the exemplary system is designed as a decentralized distributed content-addressed storage system, where each one of the illustrated subscriber nodes is able to store data relating to an object in its storage device and to provide these data to the other subscriber nodes via its communication device and the communication network, in particular according to the peer-to-peer principle. On the other hand, the system, via its communication network, is connected to a further storage system (not shown in greater detail in FIG. 2), which is used to store messages about stored revision statuses in the form of transactions, and which is based on blockchain technology and is also designed as a decentralized distributed system (blockchain storage system).

Furthermore, a machine-executable program code is stored in the storage device of each subscriber node, which, when executed by the processing device of the respective subscriber node, causes the data relating to an object to be provided in accordance with the method according to the invention.

Subscriber nodes K1, K2, and K3 are object instances. Subscriber node K4 is not an object instance, but makes available its resources, in particular computing, storage, and communication resources, to the object instances G1 and G2 which are in communication connection with the subscriber node K4 for reasons of insufficient computing and/or storage capacity.

For the sake of better comprehension, essential aspects and findings on which the invention is based will now be explained in more detail with reference to FIGS. 3 through 11.

Figure 3:
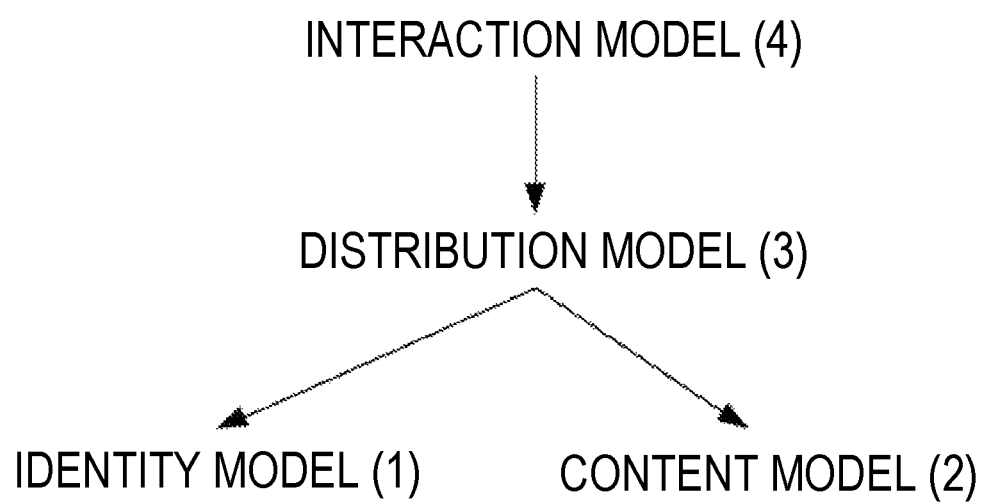
FIG. 3 schematically illustrates four basic requirements for the functioning of the method according to the invention.

FIG. 3 shows four basic requirements for the functioning of the method of the invention. Accordingly, an identity model 1 and a content model 2 are first required, on which a distribution model 3 is based, on which in turn an interaction model 4 is based.

Figure 4:
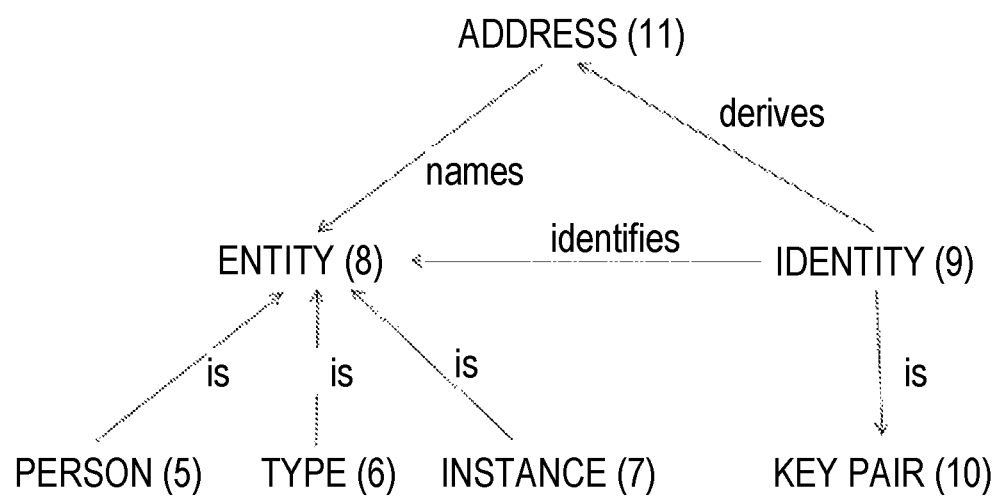
FIG. 4 schematically illustrates the identity model which is one of the basic requirements.

FIG. 4 illustrates the identity model which is one of the basic requirements. Accordingly, there are persons 5, (object) types 6, and (object) instances 7, all of which are entities 8 or are represented by entities 8 which can be provided with data. Persons, types, and/or instances, as actors, are able to change the descriptive data of persons, types, and/or instances. All entities are identified by a cryptographic identity 9. In the proposed method, the cryptographic identity is an asymmetrical cryptographic key pair 10 which consists of a publicly known key and a private key. A cryptographic one-way function (hash function) is used to derive, from the publicly known key, an address 11 which can be used to name or address the identity.

As a result of a development process, for example, the manufacturer of a product (e.g. power supply unit) or of a composite product (e.g. switch cabinet) generates a type. The type represents the production specification in digital form. As a result of a production process, for example, the manufacturer of the product (e.g. power supply unit) or of a composite product (e.g. switch cabinet) generates an instance based on a type. The instance represents the physical object in digital form.

Figure 5:
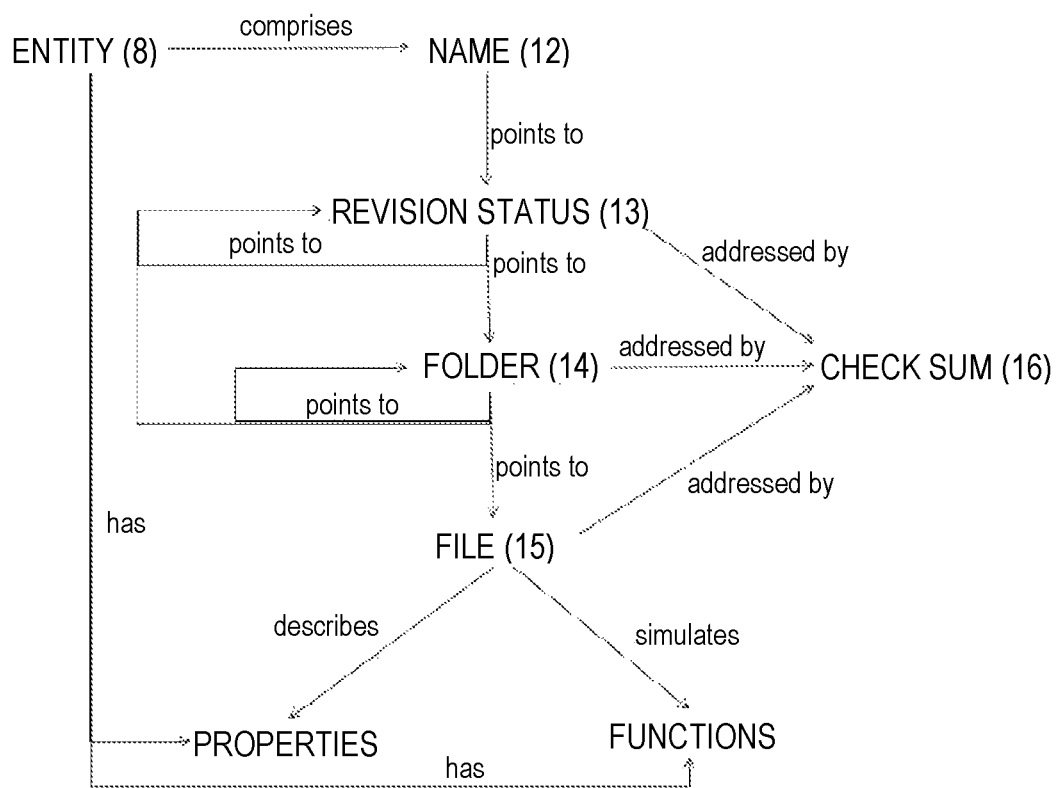
FIG. 5 schematically illustrates the content model which is one of the basic requirements.

FIG. 5 illustrates the content model which is one of the basic requirements. The data relating to a person or to an object or to an object type or to an object instance are structured or organized in files 15, folders 14, and revision statuses 13 which can be retrieved via names 12 and are linked to the entity. In other words, an entity 8 comprises a finite list of names 12, and each name points to a revision status 13 of the entity.

In the case of a type, for example, sequential numbers, version numbers, maturity level descriptions, or project milestones can be used as names. In the case of an instance, for example, production steps, revision cycles or the designation of service processes can be used as names.

A revision status contains at least one author, a revision date, and a revision text (not shown in FIG. 5). Furthermore, a revision status points to a hierarchical structure of folders 14 and files 15 in which the data are contained or organized. Files, folders, and revision statuses can be addressed using cryptographic checksums (hash values) which are generated from the content of the data using cryptographic hash functions and which represent unique and unchangeable primary keys (not shown in FIG. 5).

The data describe the properties and functions that an entity possesses, and the properties and functions can be of technical or of commercial nature, for example.

Furthermore, each revision status may refer to one or more previous revision statuses. Thus, a history of the entity's data is represented.

Examples of specifying data of a type are classification data, drawings, circuit diagrams, data sheets, instructions, product photos, and descriptive product texts. In the case of composite products, types may contain references to the revision statuses of other types.

Examples of specifying data of an instance are serial numbers, test reports, parameters, programs, status data, installation location, and installation history. In the case of composite products, instances may contain references to the revision statuses of other instances. Instances furthermore contain references to revision statuses of the type on the basis of which the instance was generated.

The following table shows examples for how an instance is derived from a type by a process.

| Type | Process | Instance |
|---|---|---|
| PHOENIX CONTACT Article 2904600 power supply unit - QUINT4-PS/1AC/24DC/5 | production | device with serial number 21751T0352 |
| Configurable article Distribution block PHOENIX CONTACT PT-FIX | configuration | configured article with article number 9876543 |
| Software source code for control firmware | compilation/linking | software object code (executable file, e.g. "BIN", "EXE", "OBJ") |
| Equipment design (descriptive data including, e.g., circuit diagram, drawings, instructions, programs) | installation/assembly | installed equipment machine BM-12345 |

Figure 6:
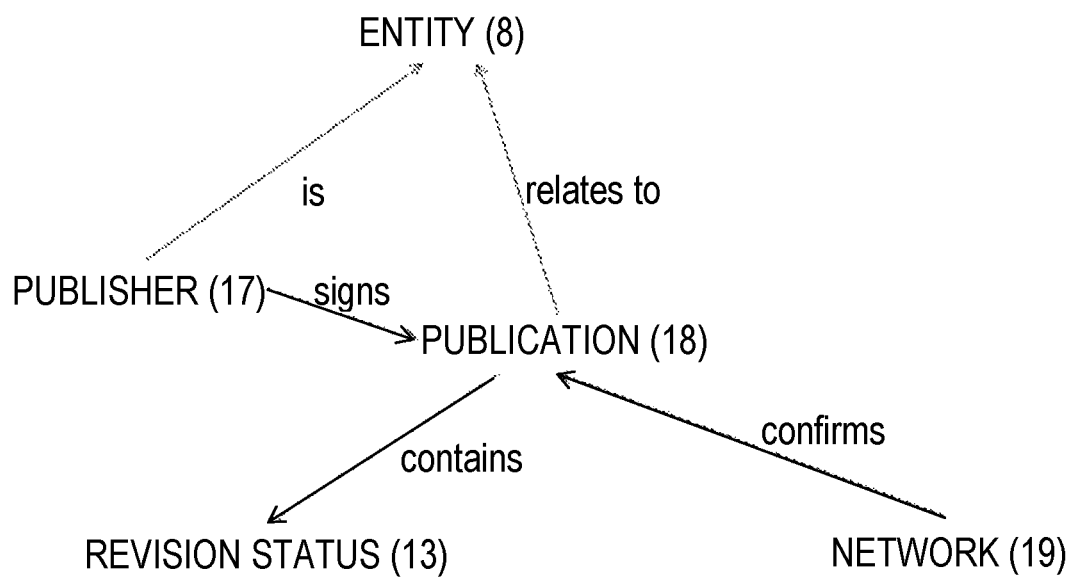
FIG. 6 schematically illustrates the distribution model, which is one of the basic requirements, with regard to write authorization.

FIG. 6 illustrates the distribution model, which is one of the basic requirements, with regard to write authorization. At certain points in time during the life cycle of an entity, entities exchange data. The entity that wants to provide new or changed data is referred to as the publisher 17. The publication 18 relates to the same or to a different entity (e.g. type/instance) and contains the revision status 13 that is to be transferred or made available. What is referred to as publication, here, is the data object that is stored or made available in a decentralized distributed content-addressed storage system.

The publisher releases the publication by digitally signing it with the private key of his identity and transmitting it to a decentralized network 19, and, strictly speaking, only a hash value generated on the basis of the data object is signed and transmitted. The decentralized network in the form of a decentralized distributed storage system based on blockchain technology (blockchain storage system) is characterized by meshed communication subscribers (subscriber nodes) and structurelessness. For example, no star structure, ring structure or otherwise defined structure is required to operate such a network. The network confirms the publication if the digital signature is valid and makes available the referenced information within the network.

The network ensures that the transaction cannot be undone and that its content cannot be changed. Moreover, the use of a digital signature defines the write authorization of the distribution model, since provisions are made so that, generally, a transaction without a signature cannot be stored.

Figure 7:
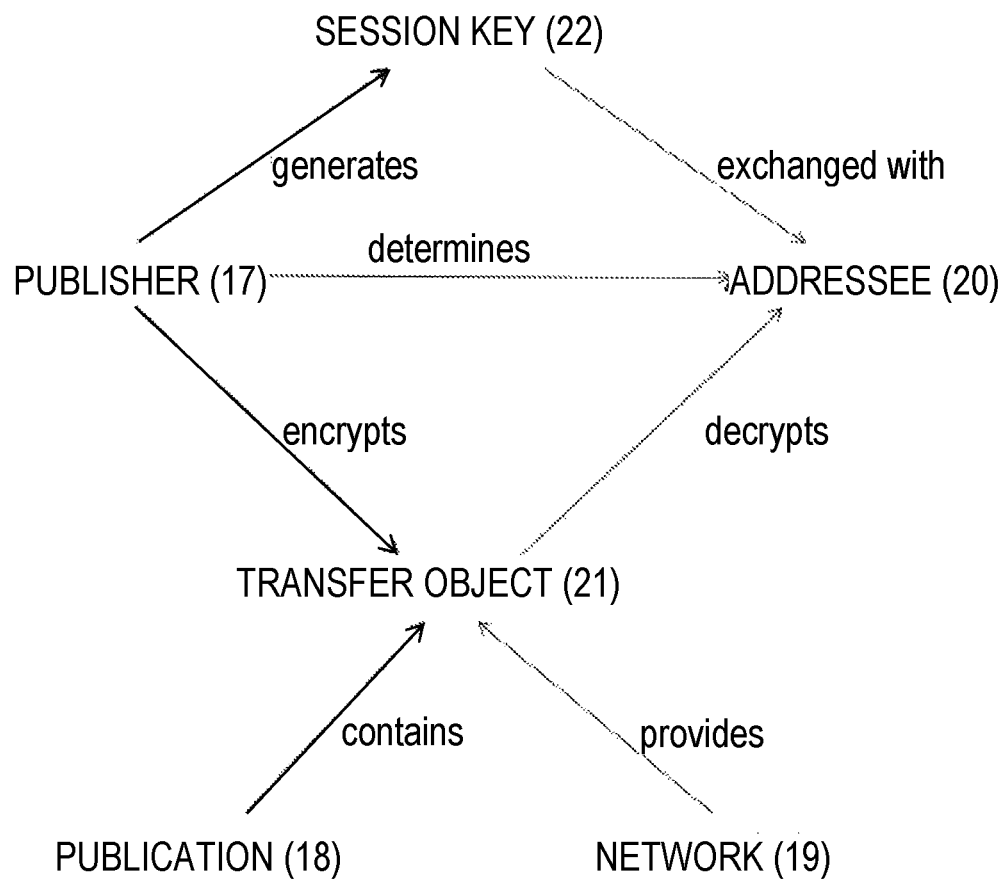
FIG. 7 schematically illustrates the distribution model, which is one of the basic requirements, with regard to read authorization.

FIG. 7 illustrates the distribution model, which is one of the basic requirements, with regard to read authorization. Accordingly, the publisher 17 also determines the entity or entities that are intended to have read access to the publication 18. These entities are the addressees or intended recipients of the publication. Based on the publication, the publisher creates a transfer object (21) by encrypting the publication using a randomly generated session key (22). The session key is exchanged with the addressees in encrypted form using their public keys. The publisher makes available the transfer object in the network.

Like the publication before, the transfer object is also addressed by its cryptographic checksum (hash value).

Thus, the read authorization of the distribution model is defined by the use of encryption.

Figure 8:
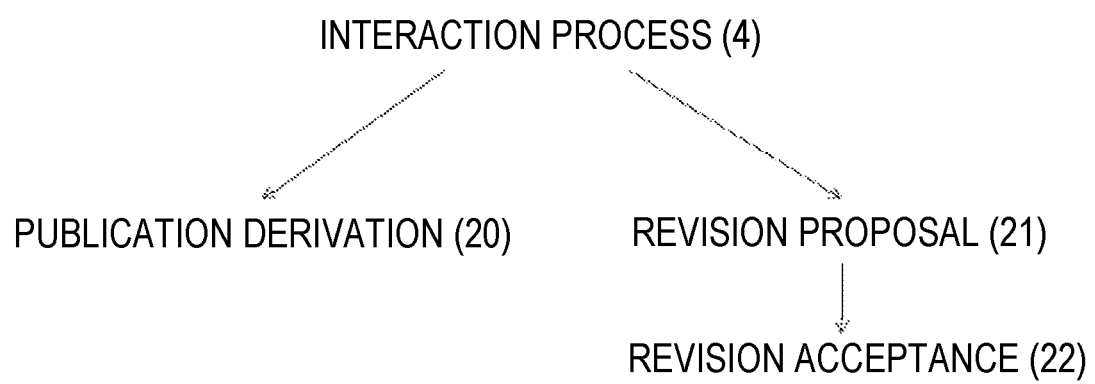
FIG. 8 schematically illustrates the interaction model which is one of the basic requirements.

FIG. 8 illustrates the interaction model which is one of the basic requirements. Based on the distribution model, the proposed interaction model offers three possible actions for interaction during the life cycle.

Figure 9:
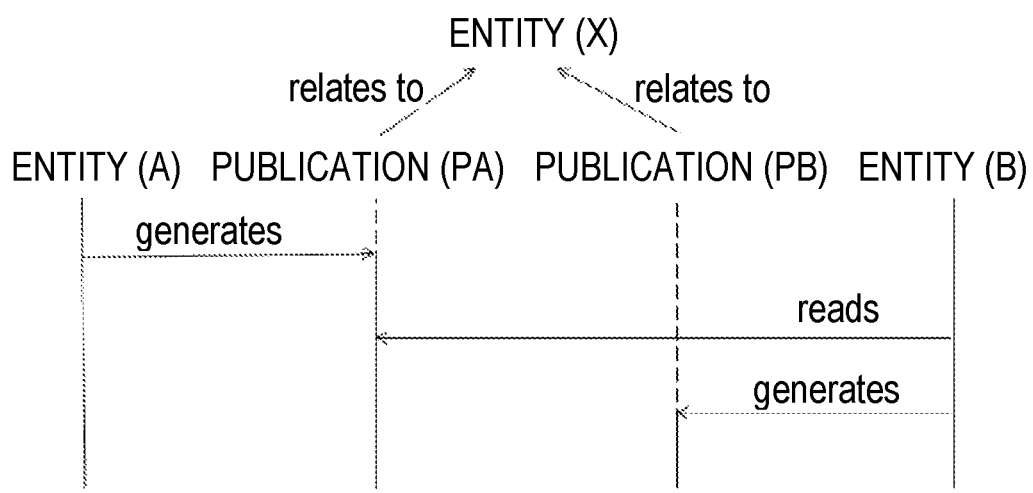
FIG. 9 schematically illustrates the sequence of a publication derivation.

With the publication derivation 20, an entity is able to generate a new publication based on another publication (see also FIG. 9).

Figure 10:
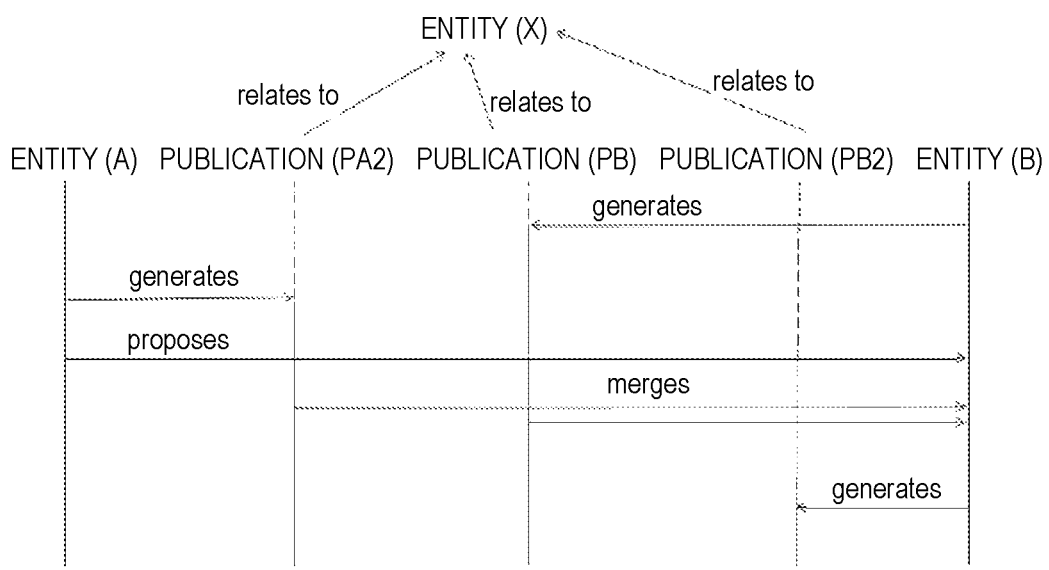
FIG. 10 schematically illustrates the sequence of a revision proposal with subsequent revision acceptance.

With the revision proposal 21, a publisher signals to another publisher that revisions to an entity are existing in the form of a new publication and at the same time recommends their acceptance (see also FIG. 10).

The other publisher can decide to accept the revision 22 (see also FIG. 11) or can reject the proposed revision.

FIG. 9 illustrates the sequence of a publication derivation (see also FIG. 8). The publication derivation is based on the methods for reading and writing information as defined in distribution model 3 (see FIGS. 6 and 7). The publication derivation allows the provision and thus the forwarding of information about an entity X from an entity A to an entity B. For this purpose, entity A first generates a publication PA that relates to entity X and contains or refers to a revision status. Being the publisher of the publication, entity A designates the entity B as one of the addressees. This allows the entity B to read the contents of the publication. With the available data, entity B is able to derive a new publication PB. Publication PB may relate to the same revision status as publication PA, that means it will only differ with respect to the publisher (here A and B) if, for example, entity B accepts all revisions 1:1 from entity A with regard to entity X, or the publication PB contains or already refers to a new revision status, i.e. it differs from publication PA also in terms of content if, for example, entity B accepts the revision status from entity A with regard to entity X and adds its own revision before publication.

The following table shows examples for entity A according to FIG. 9, which publishes/provides publications/revision statuses including data/information relating to entity X for the entity B on the occasion of particular events.

| Event | Publication with regard to entity X | Entity A | Entity B |
|---|---|---|---|
| Completion of design | circuit diagram | electronics engineer | dispatcher (procurement) |
| Completion of design | switch cabinet 3D model | mechanical engineer | dispatcher (procurement) |
| Device tested and serial number generated | power supply unit device with serial number 21751T0352 | guidance system on production line | commissioning engineer |
| Completion of parameterization | power supply unit device with serial number 21751T0352 | commissioning engineer | service staff member |
| Modification of parameterization | power supply unit device with serial number 21751T0352 | service staff member | service staff member |

FIG. 10 illustrates the procedure of a revision proposal with subsequent revision acceptance (see also FIG. 8). This allows modified information about an entity X to be forwarded from an entity A to an entity B. A precondition is that entity B has already derived a publication PB that relates to entity X. This publication PB may, for example, have been generated by a previous publication derivation 20 (see also FIG. 9). Entity A now creates a new publication PA2, which again relates to entity X and contains or refers to a new revision status. Entity A now proposes to the entity B the new revision status or the name assigned to this revision status of publication PA2, as a revision proposal. The proposal is transmitted to entity B via the network 19 or via some other communication channel. Since the network is configured as a decentralized distributed storage system based on blockchain technology, the proposal is made available in the form of a transaction (permanent message) which in particular contains the address of the sender or publisher, the address of the recipient, the address of the entity to which the revision status relates, and the address or name of the revision status (e.g. "master" or "dev").

There are various ways how a recipient can find out about the existence of a new revision proposal. For example, he or she may actively search for existing revisions, "on demand". Alternatively, the recipient can be automatically notified, "on subscription", by subscribing to revisions that arrive in the system. Or, the sender or publisher of the revision proposal contacts the recipient on a communication channel external to the system, for example by messenger, e-mail, telephone, letter.

After a revision proposal has been made, entity B decides whether the revision proposal should be accepted or rejected. If the revision proposal of publication PA2 is intended to be rejected, no further interaction will take place. However, if the proposed revision is intended to be adopted, entity B generates a new publication PB2, which either merges the revision status from PB and PA2 by referring to both of them or accepts the revision status of PA2 by only referring thereto.

In order to actively search for existing revision proposals or revision statuses that represent a revision proposal, the recipient may, for example, search the blockchain or the blockchain storage system for transactions that contain information with respect to a revision status addressed to the recipient and/or relating to the entity. On the one hand, this is possible because the transactions preferably also contain, stored therein as part of the transaction data, the addresses of the sender and of the recipient, i.e. their public keys or the first hash values generated on the basis thereof. On the other hand, there may be transactions in which the addresses of revision statuses (or data objects) and of entities are stored for the purpose of mutual association. The names of revision statuses may also be stored in transactions. For example, the recipient may search through a list of transactions in the blockchain or an indexing structure derived therefrom, such as the so-called Event Logs in the case of the blockchain service platform Ethereum. Once the recipient has determined a transaction, he or she will then also know the sender of the revision proposal. Thereafter, the recipient will receive the data object addressed in the transaction and decrypt it if necessary. The recipient can now compare the content of the revision status of the data object, that is, the revisions proposed by the sender, with another revision status available with the recipient. The names optionally assigned to the revision statuses facilitate a targeted inspection or comparison of a plurality of revision statuses. If the recipient wants to accept the proposed revision, he or she can merge the two revision statuses and generate a new revision status.

The invention claimed is:

1. A method for securely providing data of an object over the entire life cycle thereof,
wherein the object is represented by a respective individual entity which is made identifiable on the basis of a cryptographic identity by generating an asymmetric key pair for the entity, comprising a public key and a private key, and to which an address is assigned,
comprising the steps of:
(a) generating data relating to said object;
(b) generating a first hash value on the basis of the data generated in step (a) using a cryptographic hash function;
(c) generating a revision status;
(d) storing the data generated in step (a) and the first hash value generated in step (b) as payload data in the revision status generated in step (c);
(e) generating a second hash value on the basis of the revision status using a cryptographic hash function, which is the same as or different from the cryptographic hash function of step (b), wherein the second hash value serves as the address of the revision status;
(f) creating a data object;
(g) storing the revision status and the second hash value in the data object created in step (f); and
(h) storing the data object in a decentralized distributed content-addressed storage system.

2. The method as claimed in claim 1,
wherein the public key of the entity is used as the address of the entity or wherein an address hash value, which is generated using a cryptographic hash function on the basis of the public key of the entity, is used as the address of the entity, wherein the cryptographic hash function used for generating the address hash value and the cryptographic hash functions of steps (b) and (e) are the same, different, or any combination thereof.

3. The method as claimed in claim 1,
wherein the data relating to the object specify features of the object.

4. The method as claimed in claim 1,
wherein the data relating to the object and stored in a revision status are structured hierarchically in files and folders;
wherein starting at the lowest hierarchical level up to the highest hierarchical level, at least one file hash value and/or folder hash value is generated step-by-step, depending on the number of existing files and/or folders;
wherein, for each file, a file hash value is generated on the basis of the file content thereof using a cryptographic hash function;
wherein, for each folder containing only a number of files, a folder hash value is generated on the basis of the file names and the file hash values of the files contained in the folder using a cryptographic hash function;
wherein, for each folder containing only a number of folders, a folder hash value is generated on the basis of the folder names and the folder hash values of the folders contained in the folder using a cryptographic hash function;
wherein, for each folder containing a number of folders and a number of files, a folder hash value is generated on the basis of the folder names and the folder hash values of the folders contained in the folder and on the basis of the file names and the file hash values of the files contained in the folder using a cryptographic hash function;
wherein, in step (b), the first hash value is generated on the basis of the folder names and folder hash values of the folders present on the highest hierarchy level and/or on the basis of the file names and file hash values of the files present on the highest hierarchy level using a cryptographic hash function;

wherein the cryptographic hash functions, including the cryptographic hash functions of steps (b) and (e), are the same, different, or any combination thereof.

5. The method as claimed in claim 1,
wherein, in step (d), in addition to user data, additional data are stored in the revision status generated in step (c), including an author of the revision, a revision date, a revision time, a text describing the revision, and/or a data volume value.

6. The method as claimed in claim 1,
wherein, in step (d), in addition to user data, the address of the entity is stored as additional data in the revision status generated in step (c).

7. The method as claimed in claim 1,
wherein, in step (g), a name is generated for the revision status and is assigned to the revision status and is also stored in the data object created in step (f).

8. The method as claimed in claim 1,
wherein, in step (d), in addition to the payload data, the second hash value of an older revision status or the second hash value of each of multiple older revision statuses is or are stored as additional data in the revision status generated in step (c).

9. The method as claimed in claim 1,
wherein the life cycle of the object already begins before the manufacture thereof;
wherein the object is existent as an object type prior to the manufacture thereof; and
wherein, with the start of its production, the object is existent as at least one object instance;
wherein each object instance is derived from the object type;
wherein each object type and each object instance is represented by a respective individual entity;
wherein, in step (d), in addition to the payload data, the third second hash value of a revision status of the object type is stored as additional data in the revision status generated in step (c) of a newly derived object instance.

10. The method as claimed in claim 9,
wherein, in step (d), in addition to the payload data, the second hash value of a revision status of the object type is stored as additional data in the revision status of an existing object instance generated in step (c).

11. The method as claimed in claim 9,
wherein, in step (d), in addition to the payload data, the second hash value of a revision status
of another object type or the second hash value of each of revision statuses of multiple other object types is or are stored as additional data in the revision status of an object type generated in step (c).

12. The method as claimed in claim 1,
wherein the decentralized distributed content-addressed storage system is configured according to the InterPlanetary File System (IPFS).

13. The method as claimed in claim 1,
wherein a person involved in the method is also represented by a separate entity.

14. The method as claimed in claim 1,
wherein, in step (g), following the storing of the revision status in the data object, the data object is encrypted using a randomly generated symmetric session key.

15. The method as claimed in claim 14,
wherein in step (g), following the encrypting, the symmetric session key is encrypted using the asymmetric public key of an intended recipient.

16. The method as claimed in claim 1,
wherein, in step (g), a third hash value is generated on the basis of the data object using a cryptographic hash function, wherein the third hash value serves as the address of the data object, wherein the cryptographic hash function used for generating the third hash value and the cryptographic hash functions of steps (b) and (e) are the same, different, or any combination thereof.

17. The method as claimed in claim 16,
wherein, for the revision status stored in step (g), a permanent message is generated and is stored in a decentralized distributed storage system based on blockchain technology;
wherein, in the decentralized distributed storage system based on blockchain technology, a data block is stored which comprises a data content and a fourth hash value, wherein the fourth hash value was generated on the basis of the data content of the data block using a cryptographic hash function and serves as the address of the data block;
further comprising the steps of:
(i) generating a transaction;
(j) storing the third hash value as part of transaction data in the transaction of step (i) and thereby linking the transaction to the data object of step (h), in which the revision status is stored;
(k) generating a further data block;
(l) storing the transaction as data content in the further data block of step (k);
(m) determining the fourth hash value, which is the hash value of the data block last stored in the decentralized distributed storage system based on blockchain technology;
(n) storing the fourth hash value as data content in the further data block of step (k);
(o) generating a fifth hash value for the further data block on the basis of the data content of the further data block using a cryptographic hash function, wherein the fifth hash value serves as the address of the further data block;
(p) storing the fifth hash value generated in step (o) in the further data block; and
(q) storing the further data block in the decentralized distributed storage system based on blockchain technology which also stores the data blocks generated at earlier points in time;
wherein the cryptographic hash functions used for generating the third hash value, the fourth hash value, and the fifth hash value and the cryptographic hash functions of steps (b) and (e) are the same, different, or any combination thereof.

18. The method as claimed in claim 17,
wherein, in step (g):
following the storing of the revision status in the data object, the data object is encrypted using a randomly generated symmetric session key;
following the encrypting, the symmetric session key is encrypted using the asymmetric public key of an intended recipient and;
the third hash value is generated on the basis of the data object using the cryptographic hash function, wherein the third hash value serves as the address of the data object;
and
wherein, in step (j), the encrypted session key is stored as a further part of the transaction data in the transaction of step (l).

19. The method as claimed in claim 1,
wherein the method steps (a) through (g) or (a) through (q) are carried out by an object entity.

20. The method as claimed in claim 1,
wherein, if required or depending on an event, the method steps (a) through (g) or (a) through (q) are carried out repeatedly.

21. A system for securely providing data of an object over the entire life cycle thereof, wherein the object is represented by a respective individual entity which is made identifiable on the basis of a cryptographic identity by generating an asymmetric key pair for the entity, comprising a public key and a 5 private key, and to which an address is assigned, wherein the system comprises:
   a communication network including at least two subscriber nodes each of which comprises a storage device and a processing device as well as a communication device for being coupled to and communicating via the communication network;
   wherein data of the object can be stored in the storage device and can be provided to at least one further subscriber node in the communication network via the communication device;
   wherein the storage device stores a machine-executable program code which, when executed by the processing device, causes the processing device to:
   (a) generate data relating to said object;
   (b) generate a first hash value on the basis of the data generated in step (a) using a cryptographic hash function;
   (c) generate a revision status;
   (d) store the data generated in step (a) and the first hash value generated in step (b) as payload data in the revision status generated in step (c);
   (e) generate a second hash value on the basis of the revision status using a cryptographic hash function, which is the same as or different from the cryptographic hash function of step (b), wherein the second hash value serves as the address of the revision status;
   (f) create a data object;
   (g) store the revision status and the second hash value in the data object created in step (f); and
   (h) store the data object in the system;
   wherein the system is configured as a decentralized distributed content-addressed storage system.

* * * * *